(12) United States Patent
Robinson, III

(10) Patent No.: US 8,833,358 B1
(45) Date of Patent: Sep. 16, 2014

(54) CONCRETE SAW SYSTEM

(76) Inventor: John J. Robinson, III, Palm Harbor, FL (US)

(*) Notice: Subject to any disclaimer, the term of this patent is extended or adjusted under 35 U.S.C. 154(b) by 160 days.

(21) Appl. No.: 13/457,743

(22) Filed: May 16, 2012

(51) Int. Cl.
*B28D 1/08* (2006.01)

(52) U.S. Cl.
USPC .......................................... 125/21; 125/16.02

(58) Field of Classification Search
CPC ................................. B28D 1/088; B28D 1/082
USPC ................................................. 125/21, 16.02
See application file for complete search history.

(56) References Cited

U.S. PATENT DOCUMENTS

| | | | | |
|---|---|---|---|---|
| 3,056,267 A | * | 10/1962 | McRee | 405/191 |
| 4,144,867 A | * | 3/1979 | Wachs et al. | 125/14 |
| 4,180,047 A | * | 12/1979 | Bertelson | 125/14 |
| 4,197,828 A | * | 4/1980 | Schellhorn | 125/23.01 |
| 4,233,954 A | * | 11/1980 | Visser | 125/14 |
| 4,327,703 A | * | 5/1982 | Destree | 125/1 |
| 4,368,720 A | * | 1/1983 | Destree | 125/14 |
| 4,979,489 A | * | 12/1990 | Abbasov et al. | 125/23.01 |
| 5,161,588 A | * | 11/1992 | Hamilton | 144/34.1 |
| 6,431,655 B1 | * | 8/2002 | Mantovani | 299/69 |
| 6,907,874 B1 | * | 6/2005 | Faircloth | 125/13.01 |
| 7,243,646 B2 | * | 7/2007 | Todack | 125/23.01 |
| 2001/0029939 A1 | * | 10/2001 | Mazaki et al. | 125/21 |
| 2002/0195094 A1 | * | 12/2002 | Crawford | 125/13.01 |
| 2011/0115639 A1 | * | 5/2011 | Hecht | 340/815.4 |
| 2011/0192389 A1 | * | 8/2011 | Jang | 125/21 |
| 2013/0294841 A1 | * | 11/2013 | Fey | 405/216 |

FOREIGN PATENT DOCUMENTS

| | | | | |
|---|---|---|---|---|
| EP | 0 540 834 B1 | * | 11/1995 | B63C 11/52 |
| WO | WO 9819837 A1 | * | 5/1998 | |

* cited by examiner

*Primary Examiner* — George Nguyen

(57) ABSTRACT

A holding assembly is formed of a base having two primary support edges and two locking fingers. A cutting assembly is formed of a platform, a cutting band, and a plurality of rollers rotatable with respect to the platform for guiding the cutting band in a path of travel above the base. An advancement assembly is formed of rails coupled to and extending upwardly from the base. Slide blocks extend downwardly from the platform for advancing the platform and cutting band. Control components include pneumatic pivot pistons mounted on the base operable to move the fingers between operative and inoperative orientations, a pneumatic advancement piston for advancing and retracting the platform, and a hydraulic motor for rotating a roller to move the cutting band.

4 Claims, 5 Drawing Sheets

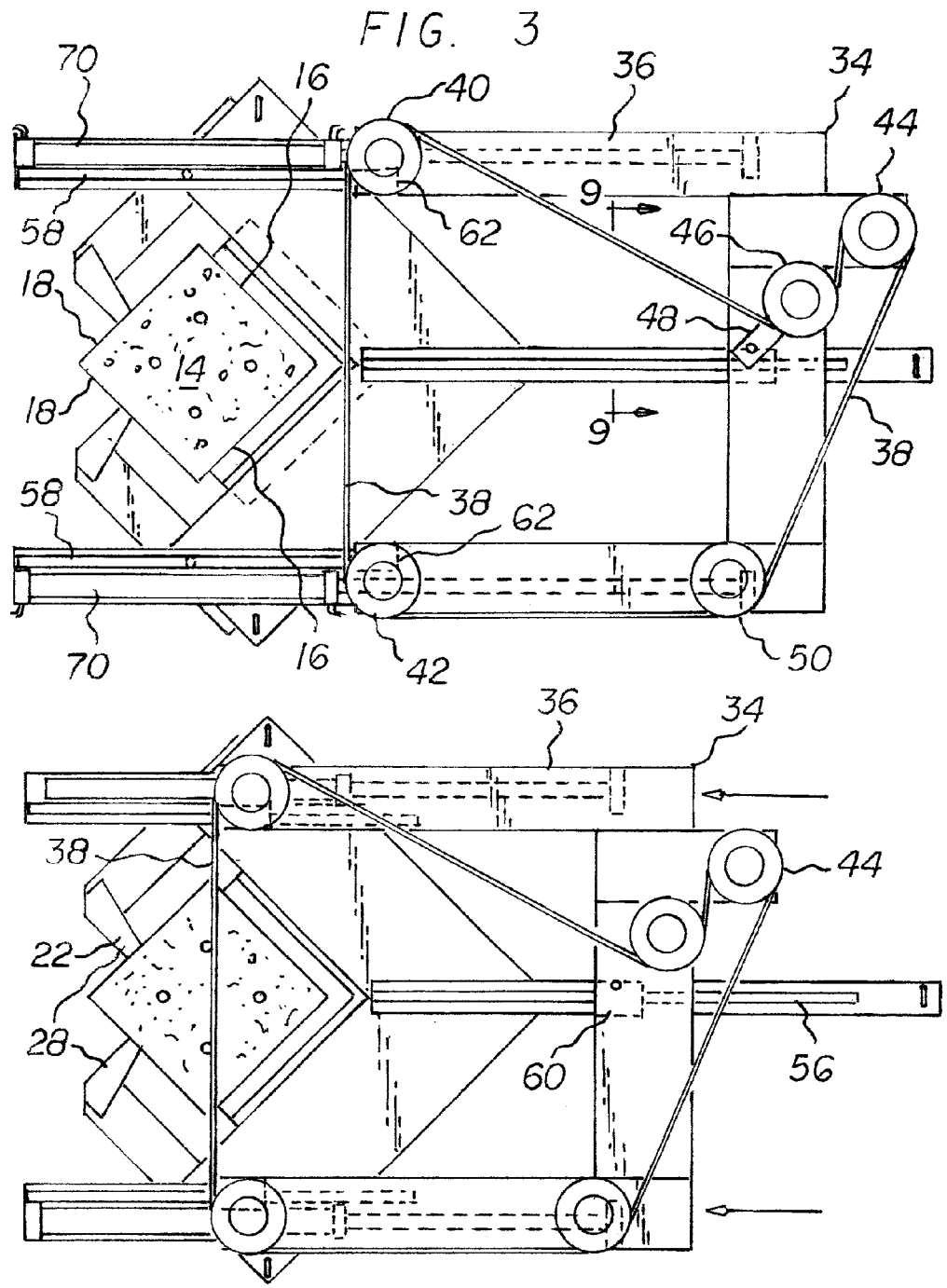

CONCRETE SAW SYSTEM

BACKGROUND OF THE INVENTION

1. Field of the Invention

The present invention relates to a concrete saw system and more particularly pertains to cutting underwater concrete pilings in a safe, convenient and economical manner.

2. Description of the Prior Art

The use of concrete saw systems of known designs and configurations is known in the prior art. More specifically, concrete saw systems of known designs and configurations previously devised and utilized for the purpose of cutting concrete are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe concrete saw system that allows cutting underwater concrete pilings in a safe, convenient and economical manner.

In this respect, the concrete saw system according to the present invention substantially departs from the conventional concepts and designs of the prior art, and in doing so provides an apparatus primarily developed for the purpose of cutting underwater concrete pilings in a safe, convenient and economical manner.

Therefore, it can be appreciated that there exists a continuing need for a new and improved concrete saw system which can be used for cutting underwater concrete pilings in a safe, convenient and economical manner. In this regard, the present invention substantially fulfills this need.

SUMMARY OF THE INVENTION

In view of the foregoing disadvantages inherent in the known types of concrete saw systems of known designs and configurations now present in the prior art, the present invention provides an improved concrete saw system. As such, the general purpose of the present invention, which will be described subsequently in greater detail, is to provide a new and improved concrete saw system and method which has all the advantages of the prior art and none of the disadvantages.

To attain this, the present invention essentially comprises a holding assembly, a cutting assembly, an advancement assembly, and control components. The holding assembly is formed of a base having two primary support edges and two locking fingers. A cutting assembly is formed of a platform, a cutting band, and a plurality of rollers rotatable with respect to the platform for guiding the cutting band in a path of travel above the base. An advancement assembly is formed of rails coupled to and extending upwardly from the base. Slide blocks extend downwardly from the platform for advancing the platform and cutting band. Control components include pneumatic pivot pistons mounted on the base operable to move the fingers between operative and inoperative orientations, a pneumatic advancement piston for advancing and retracting the platform, and a hydraulic motor for rotating a roller to move the cutting band.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved concrete saw system which has all of the advantages of the prior art concrete saw systems of known designs and configurations and none of the disadvantages.

It is another object of the present invention to provide a new and improved concrete saw system which may be easily and efficiently manufactured and marketed.

It is further object of the present invention to provide a new and improved concrete saw system which is of durable and reliable constructions.

An even further object of the present invention is to provide a new and improved concrete saw system which is susceptible of a low cost of manufacture with regard to both materials and labor, and which accordingly is then susceptible of low prices of sale to the consuming public, thereby making such concrete saw system economically available to the buying public.

Even still another object of the present invention is to provide a concrete saw system for cutting underwater concrete pilings in a safe, convenient and economical manner.

Lastly, it is an object of the present invention to provide a new and improved concrete saw system having a holding assembly formed of a base with two primary support edges and two locking fingers; a cutting assembly formed of a platform, a cutting band, and a plurality of rollers rotatable with respect to the platform for guiding the cutting band in a path of travel above the base; an advancement assembly formed of rails coupled to and extending upwardly from the base with slide blocks extending downwardly from the platform for advancing the platform and cutting band; and control components include pneumatic pivot pistons mounted on the base operable to move the fingers between operative and inoperative orientations, a pneumatic advancement piston for advancing and retracting the platform, and a hydraulic motor for rotating a roller to move the cutting band.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 3, 4 and 5 are plan views of the system taken along line 3-3 of FIG. 2 at different times during the cut.

The same reference numerals refer to the same parts throughout the various Figures.

DESCRIPTION OF THE PREFERRED EMBODIMENT

Figure 1:
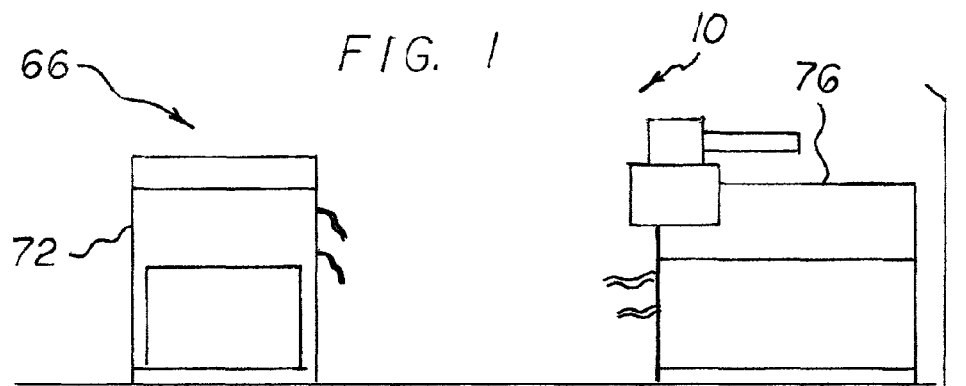
FIG. 1 is a side elevational view of the control components of a concrete saw system constructed in accordance with the principles of the present invention.
Figure 2:
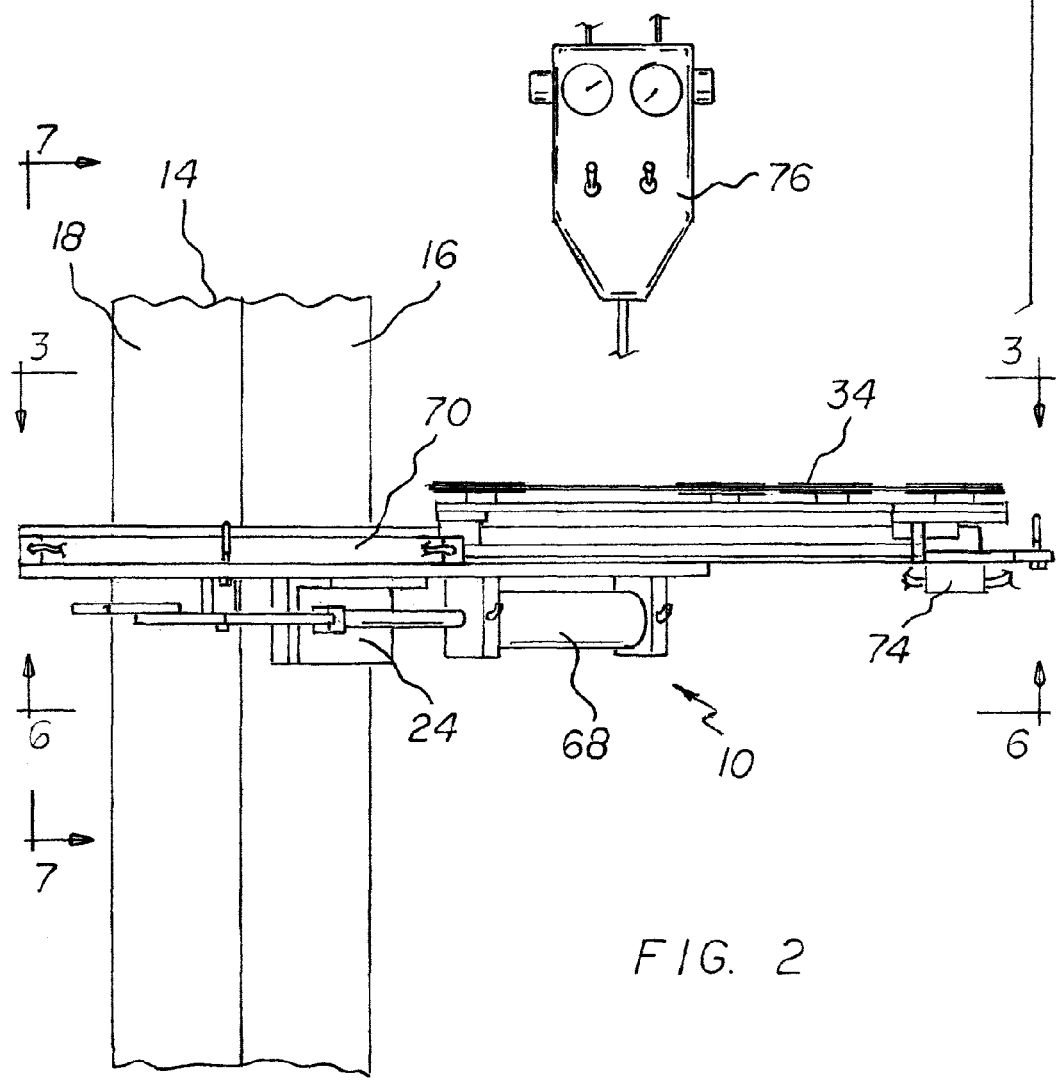
FIG. 2 is a side elevational view of the operational components of the system of FIG. 1.
Figure 5:
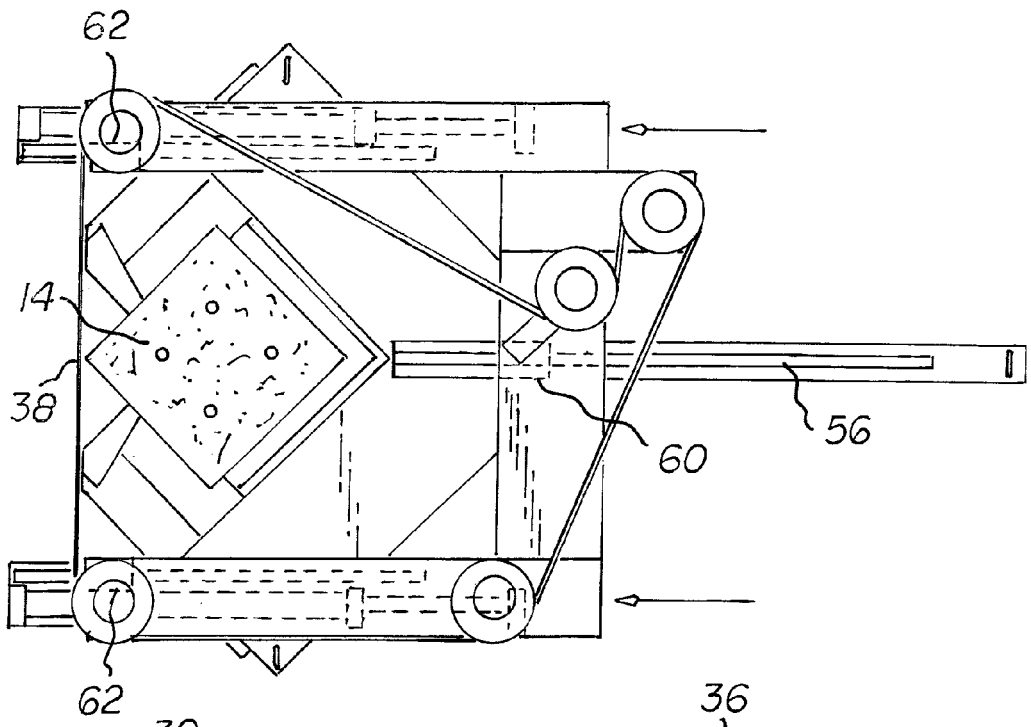
Figure 6:
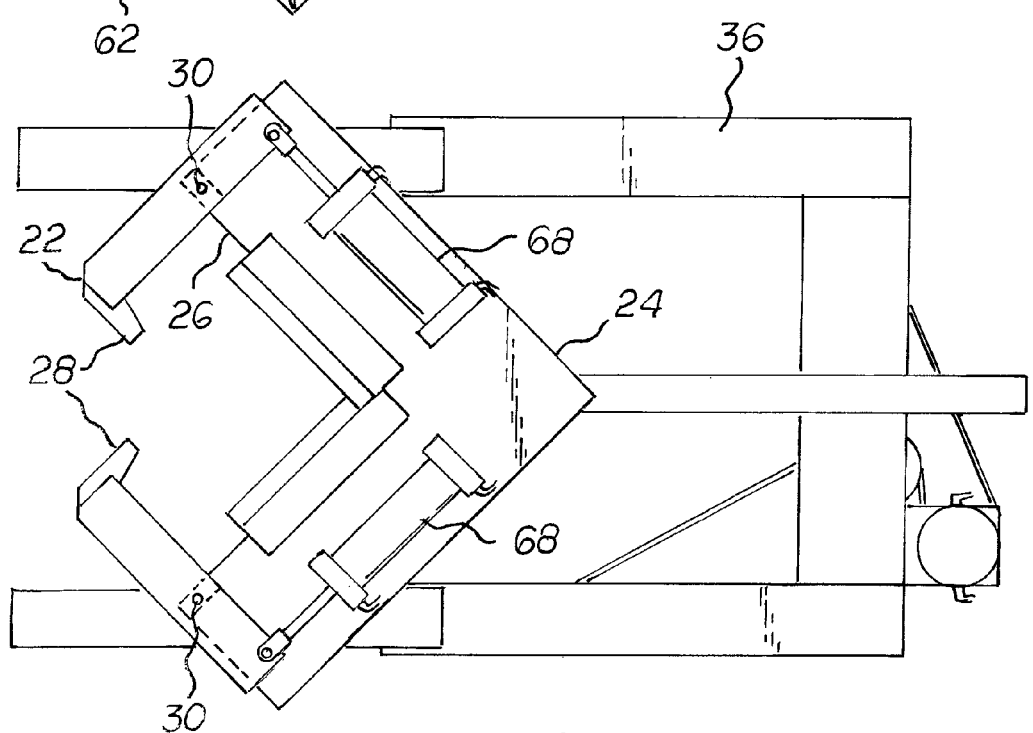
FIG. 6 is a bottom view of the operational components taken along line 6-6 of FIG. 2.
Figure 7:
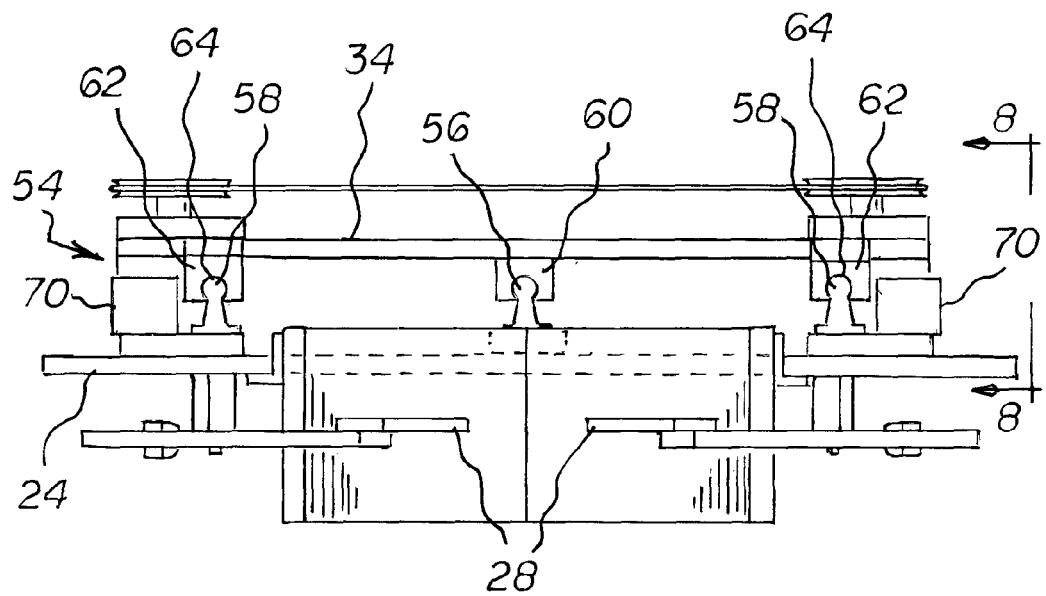
FIG. 7 is an end elevational view taken along line 7-7 of FIG. 2.
Figure 8:
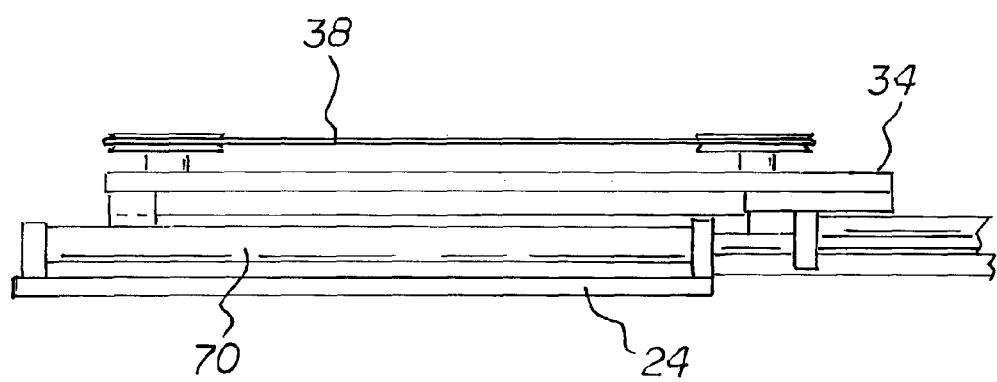
FIG. 8 is a side elevational view taken along line 8-8 of FIG. 7.
Figure 9:
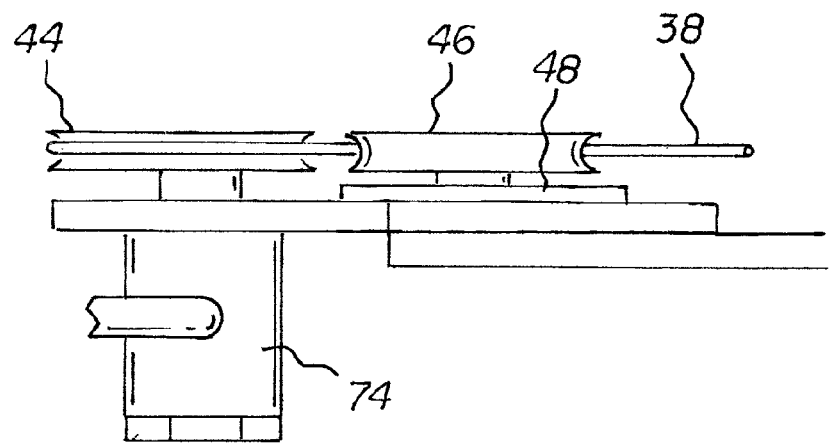
FIG. 9 is an end elevational view taken along line 9-9 of FIG. 3.
Figure 10:
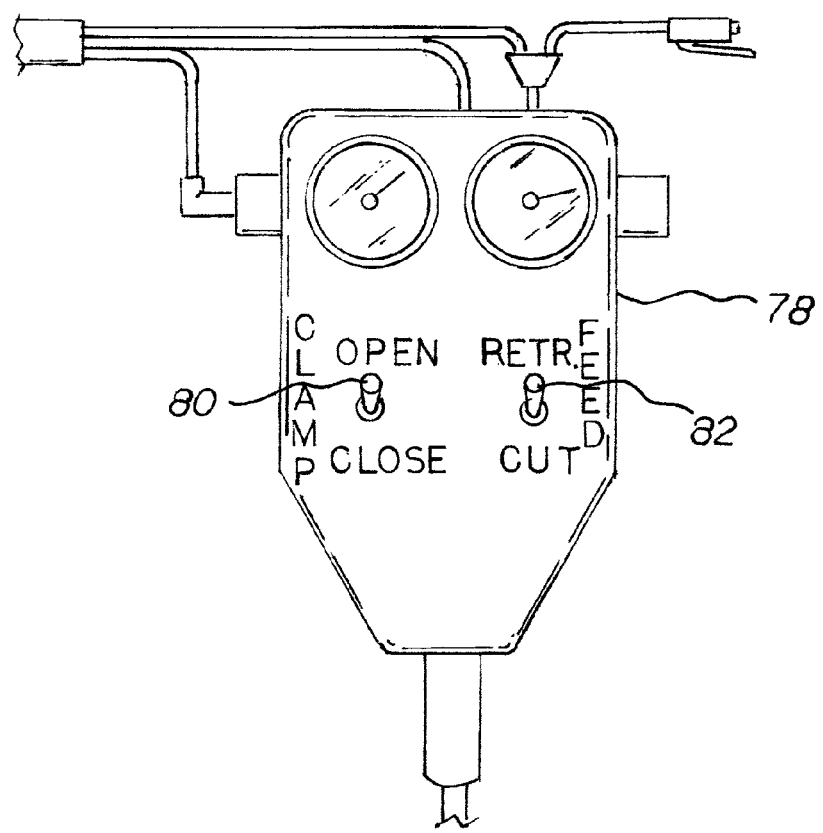
FIG. 10 is a plan view of the control module shown in FIG. 1.

With reference now to the drawings, and in particular to FIG. 1 thereof, the preferred embodiment of the new and improved concrete saw system embodying the principles and concepts of the present invention and generally designated by the reference numeral 10 will be described.

The present invention, the concrete saw system 10 is comprised of a plurality of components. Such components in their broadest context include a holding assembly, a cutting assembly, an advancement assembly, and control components.

Such components are individually configured and correlated with respect to each other so as to attain the desired objective. The concrete saw system 10 of the present invention is for cutting underwater concrete pilings. A piling 14 is first provided. The piling has a square cross sectional configuration with two first edges 16 and two second edges 18. The piling has a vertically extending central axis. The piling is located under water and is fabricated of concrete.

Next provided are operational components. The operational components include a holding assembly 22 formed of an L-shaped base 24 having two primary support edges 26 and two locking fingers 28. The primary support edges are fixedly positionable in contact with the first edges of the piling during cutting. The locking fingers have pivot pins 30 secured to the L-shaped base for pivoting the locking fingers between an operative orientation in contact with the second edges of the piling during cutting and an inoperative orientation out of contact with the second edges of the piling before cutting and after cutting.

The operational components also include a cutting assembly 34 formed of a U-shaped platform 36, a cutting band 38, and a plurality of rollers 40, 42, 44, 46, 50. The rollers are rotatable with respect to the U-shaped platform for guiding the cutting band in a horizontal path of travel above the L-shaped base in cutting contact with the piling. The rollers include two laterally spaced primary rollers 40, 42 on opposite sides of the piling with a cutting zone there between. The rollers also include a drive roller 44 for providing a motive force to the cutting band. The rollers also include a tension roller 46 adapted to oscillate on a spring urged pivot arm 48 for maintaining tension in the cutting band. The rollers also include a direction roller 50.

The operational components also include an advancement assembly 54 formed of a central rail 56 and two parallel side rails 58. The rails are coupled to and extend upwardly from the L-shaped base 24. Middle and side slide blocks 60, 62 extending downwardly from the U-shaped platform are provided. Downwardly facing recesses 64 are formed in the slide blocks slidably receiving the rails for advancing the U-shaped platform and cutting band into contact with the first edges of the piling and then through the central axis and then through the second edges. The advancement assembly is located between the L-shaped base and the U-shaped platform.

Lastly, control components 66 are provided. The control components include pneumatic pivot pistons 68 mounted on the L-shaped base operable to pivot the fingers between the operative and inoperative orientations. A pneumatic advancement piston 70 is provided for advancing the U-shaped platform and the cutting band. A pneumatic assembly 72 is next provided constituting a source of pressurized air for powering the pneumatic pivot pistons and the pneumatic advancement piston. The control components are thus operable to advance and retract the U-shaped platform and rollers and cutting band. The control components also include a hydraulic motor 74 for rotating the drive roller 44 to move the cutting band. A hydraulic assembly 76 is provided for powering the hydraulic motor. The control components also include a handheld control unit 78 with a first switch 80 and a second switch 82. The first switch is operable to power the pneumatic pivot pistons and the pneumatic advancement piston to initially advance the fingers to the operative orientation and advance the cutting band to and through the piling and then to retract the cutting band and retract the fingers to the inoperative orientation. The second switch is operable to power the hydraulic motor to move the cutting band.

The present invention as described above is a system adapted for cutting through concrete pilings when under water. It should be appreciated that the system is also adapted for cutting through concrete pilings when not under water. Further, it should be appreciated that the system is also adapted for cutting through work pieces other than concrete pilings whether under water or not.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A concrete saw system comprising:
   a holding assembly formed of a base having two primary support edges and two locking fingers;

a cutting assembly formed of a platform and a cutting band and a plurality of rollers rotatable with respect to the platform for guiding the cutting band in a path of travel above the base;

an advancement assembly formed of rails coupled to and extending upwardly from the base, slide blocks extending downwardly from the platform for advancing the platform and cutting band, the advancement assembly being located between the base and the platform; and control components including pneumatic pivot pistons mounted on the base operable to move the fingers between operative and inoperative orientations, a pneumatic advancement piston for advancing and retracting the platform, the control components also including a hydraulic motor for rotating a roller to move the cutting band.

2. The system as set forth in claim 1 and further including a concrete piling adapted to be held by the holding assembly and cut by the cutting assembly.

3. The system as set forth in claim 2 and further including a handheld control unit with a first switch and a second switch, the first switch being operable to power the pneumatic pivot pistons and the pneumatic advancement piston to initially advance the fingers to the operative orientation and advance the cutting band to and through the piling and then to retract the cutting band and retract the fingers from the inoperative orientation, the second switch being operable to power the hydraulic motor to power the cutting band.

4. A concrete saw system (10) for cutting underwater concrete pilings, the cutting of the pilings being done in a safe, convenient and economical manner, the system comprising, in combination:

a piling (14) having a square cross sectional configuration with two first edges (16) and two second edges (18), the piling having a vertically extending central axis, the piling being located under water, the piling being fabricated of concrete;

operational components including a holding assembly (22) formed of an L-shaped base (24) having two primary support edges (26) and two locking fingers (28), the primary support edges being fixedly positionable in contact with the first edges of the piling during cutting, the locking fingers having pivot pins (30) secured to the L-shaped base for pivoting the locking fingers between an operative orientation in contact with the second edges of the piling during cutting and an inoperative orientation out of contact with the second edges of the piling before cutting and after cutting;

the operational components also including a cutting assembly (34) formed of a U-shaped platform (36) and a cutting band (38) and a plurality of rollers (40) (42) (44) (46) (50) rotatable with respect to the U-shaped platform for guiding the cutting band in a horizontal path of travel above the L-shaped base in cutting contact with the piling, the rollers including two laterally spaced primary rollers (40)(42) on opposite sides of the piling with a cutting zone there between, a drive roller (44) for providing a motive force to the cutting band, a tension roller (46) adapted to oscillate on a spring urged pivot arm (48) for maintaining tension in the cutting band, and a direction roller (50);

the operational components also including an advancement assembly (54) formed of a central rail (56) and two parallel side rails (58), the rails coupled to and extending upwardly from the L-shaped base (24), middle and side slide blocks (60)(62) extending downwardly from the U-shaped platform, downwardly facing recesses (64) formed in the slide blocks slidably receiving the rails for advancing the U-shaped platform and cutting band into contact with the first edges of the piling and then through the central axis and then through the second edges, the advancement assembly being located between the L-shaped base and the U-shaped platform; and control components (66) including pneumatic pivot pistons (68) mounted on the L-shaped base operable to pivot the fingers between the operative and inoperative orientations, a pneumatic advancement piston (70) for advancing the U-shaped platform and the cutting band, a pneumatic assembly (72) constituting a source of pressurized air for powering the pneumatic pivot pistons and the pneumatic advancement piston, the control components thus operable to advance and retract the U-shaped platform and rollers and cutting band, the control components also including a hydraulic motor (74) for rotating the drive roller (44) to move the cutting band, a hydraulic assembly (76) for powering the hydraulic motor, the control components also including a handheld control unit (78) with a first switch (80) and a second switch (82), the first switch being operable to power the pneumatic pivot pistons and the pneumatic advancement piston to initially advance the fingers to the operative orientation and advance the cutting band to and through the piling and then to retract the cutting band and retract the fingers to the inoperative orientation, the second switch being operable to power the hydraulic motor to move the cutting band.

\* \* \* \* \*